United States Patent
Asai

(10) Patent No.: US 9,787,543 B2
(45) Date of Patent: Oct. 10, 2017

(54) COMMUNICATION APPARATUS AND COMMUNICATION METHOD

(71) Applicant: Mitsubishi Electric Corporation, Tokyo (JP)

(72) Inventor: Hidefumi Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/117,520

(22) PCT Filed: Jan. 26, 2015

(86) PCT No.: PCT/JP2015/052058
§ 371 (c)(1),
(2) Date: Aug. 9, 2016

(87) PCT Pub. No.: WO2016/120976
PCT Pub. Date: Aug. 4, 2016

(65) Prior Publication Data
US 2016/0359670 A1    Dec. 8, 2016

(51) Int. Cl.
*G06F 15/177* (2006.01)
*H04L 12/24* (2006.01)

(52) U.S. Cl.
CPC ...... *H04L 41/0886* (2013.01); *H04L 41/0823* (2013.01)

(58) Field of Classification Search
CPC .................. H04L 41/0886; H04L 41/0823
See application file for complete search history.

(56) References Cited

U.S. PATENT DOCUMENTS 6,457,055 B1 *  9/2002  Hwong ............. H04L 12/40136
                                              370/242
7,529,248 B2    5/2009  Konuma et al.
(Continued)

FOREIGN PATENT DOCUMENTS

JP      2003-198578 A    7/2003
JP      2003-258937 A    9/2003
(Continued)

OTHER PUBLICATIONS

Communication dated Oct. 18, 2016, issued by the Korean Intellectual Property Office in corresponding Korean Application No. 10-2016-7022717.

(Continued)

*Primary Examiner* — Jonathan Bui
(74) *Attorney, Agent, or Firm* — Sughrue Mion, PLLC; Richard C. Turner

(57) ABSTRACT

A communication apparatus includes a physical layer circuit that functions as a physical layer for communication with a communication destination and can perform an automatic negotiation with the communication destination for determining communication setting information representing physical setting of communication with the communication destination, a nonvolatile storage unit, and a control unit that controls the physical layer circuit. In one operating mode, the control unit controls the physical layer circuit such that an automatic negotiation with the communication destination is performed and communication setting information determined by the automatic negotiation in the storage unit is written. In another operating mode, the control unit writes the communication setting information stored in the storage unit in the physical layer circuit.

10 Claims, 7 Drawing Sheets

(56) References Cited

U.S. PATENT DOCUMENTS

| | | | |
|---|---|---|---|
| 8,677,176 B2 | 3/2014 | Buckland et al. | |
| 8,799,702 B2 | 8/2014 | Buckland et al. | |
| 2002/0159400 A1* | 10/2002 | Park | H04L 12/413 370/282 |
| 2005/0030808 A1* | 2/2005 | Brown | H04L 12/12 365/222 |
| 2005/0213512 A1 | 9/2005 | Konuma et al. | |
| 2006/0212730 A1* | 9/2006 | Senda | G06F 1/32 713/300 |
| 2012/0173896 A1* | 7/2012 | Tanaka | G03G 15/5004 713/300 |
| 2013/0054725 A1* | 2/2013 | Chan | H04L 69/24 709/209 |
| 2013/0159608 A1 | 6/2013 | Shin | |

FOREIGN PATENT DOCUMENTS

| | | |
|---|---|---|
| JP | 2006-100940 A | 4/2006 |
| JP | 2008-211578 A | 9/2008 |
| JP | 2012-118974 A | 6/2012 |
| JP | 5093519 B2 | 12/2012 |
| JP | 2013-197972 A | 9/2013 |
| KR | 1020050096824 A | 10/2005 |
| KR | 1020130070251 A | 6/2013 |

OTHER PUBLICATIONS

Notification of Reason for Refusal of JP 2015-538790 dated Sep. 8, 2015.
Decision to Grant for JP 2015-538790 dated Nov. 17, 2015.
International Search Report for PCT/JP2015/052058 dated Mar. 17, 2015.
Communication dated May 19, 2017, issued by the German Patent Office in counterpart German Application No. 112015000526.9.
Communication dated May 3, 2017 from the State Intellectual Property Office of the P.R.C. in counterpart Application No. 201580010463.9.

\* cited by examiner

FIG.5

| No | OPERATING MODE | AUTOMATIC NEGOTIATION FUNCTION | DETERMINATION OF COMMUNICATION SETTING INFORMATION | ACCESS TO STORAGE UNIT |
|---|---|---|---|---|
| 1 | NORMAL OPERATING MODE | VALIDATED | DETERMINED BY AUTOMATIC NEGOTIATION | NONE |
| 2 | HIGH-SPEED LINK-UP SETTING MODE | VALIDATED | DETERMINED BY AUTOMATIC NEGOTIATION | WRITE COMMUNICATION SETTING INFORMATION AT EITHER TIMING DESCRIBED BELOW<br>(1) AT TIME OF TRANSITION TO HIGH-SPEED LINK-UP SETTING MODE<br>(2) AT TIME OF CHANGE FROM LINK-DOWN TO LINK-UP |
| 3 | HIGH-SPEED LINK-UP OPERATING MODE | INVALIDATED | COMMUNICATION SETTING INFORMATION STORED IN STORAGE UNIT | READ COMMUNICATION SETTING INFORMATION AT TIME OF POWER-ON |

COMMUNICATION APPARATUS AND COMMUNICATION METHOD

CROSS REFERENCE TO RELATED APPLICATIONS

This application is a National Stage of International Application No. PCT/JP2015/052058 filed Jan. 26, 2015, the contents of all of which are incorporated herein by reference in their entirety.

FIELD

The present invention relates to a communication apparatus and a communication method that perform communication with a communication destination.

BACKGROUND

A physical layer circuit that functions as a communication physical layer, as exemplified by 1000 Base-T (IEEE 802.3ab), has an automatic negotiation function in order to establish communication, i.e., to achieve a link-up, with a communication destination. To establish the communication, the automatic negotiation function determines the communication setting information on the physical settings for communication with a physical layer circuit at the communication destination.

Related techniques include Patent Literatures 1 to 3 listed below.

CITATION LIST

Patent Literatures

Patent Literature 1: Japanese Patent Application Laid-open No. 2003-198578
Patent Literature 2: Japanese Patent Application Laid-open No. 2006-100940
Patent Literature 3: Japanese Patent Application Laid-open No. 2012-118974

SUMMARY

Technical Problem

A technique described in Patent Literature 1 is a network device that disables an automatic negotiation function by using a DIP switch and that sets transmission setting data by using the DIP switch. According to the technique described in Patent Literature 1, if the automatic negotiation function is disabled, transmission setting data needs to be set by the DIP switch, and thus a setting operation of transmission setting data performed by a user is required.

A technique described in Patent Literature 2 is a duplex mode matching method that stores a duplex mode determined by a PHY automatic negotiation in a memory as a MAC duplex mode. The technique described in Patent Literature 2 does not reduce the time required for establishing communication with a communication destination.

According to a technique described in Patent Literature 3, upon reception of a signal such as a link-down event from a PHB or a route port, CPU firmware checks the operating condition of the cable or link and performs rerouting, from a PHB that has lost its cable connection, to an unused lane of another active PHB cable. The technique described in Patent Literature 3 does not reduce the time required for establishing communication with a communication destination.

The present invention has been made in view of the above problems, and an objective of the present invention is to provide a communication apparatus that can reduce the time required for establishing communication with a communication destination.

Solution to Problem

In order to solve the problem and achieve the objective mentioned above, the present invention relates to a communication apparatus that includes a physical layer circuit that functions as a physical layer for communication with a communication destination and can perform an automatic negotiation with the communication destination for determining communication setting information representing a physical setting of communication with the communication destination; a nonvolatile storage unit; and a control unit that controls the physical layer circuit. The control unit, in one operating mode, controls the physical layer circuit such that an automatic negotiation with the communication destination is performed and such that the communication setting information determined by the automatic negotiation is written in the storage unit, and writes, in another operating mode, the communication setting information stored in the storage unit in the physical layer circuit.

Advantageous Effects of Invention

According to the communication apparatus and the communication method of the present invention, the time required for establishing communication with a communication destination can be reduced.

BRIEF DESCRIPTION OF DRAWINGS

FIG. 5 is a table illustrating processing items when establishing communication of the communication apparatus in respective operating modes according to the first embodiment.

DESCRIPTION OF EMBODIMENTS

Exemplary embodiments of a communication apparatus and a communication method according to the present invention will be explained below in detail with reference to the accompanying drawings. The present invention is not limited to the embodiments.

First Embodiment

Figure 1:
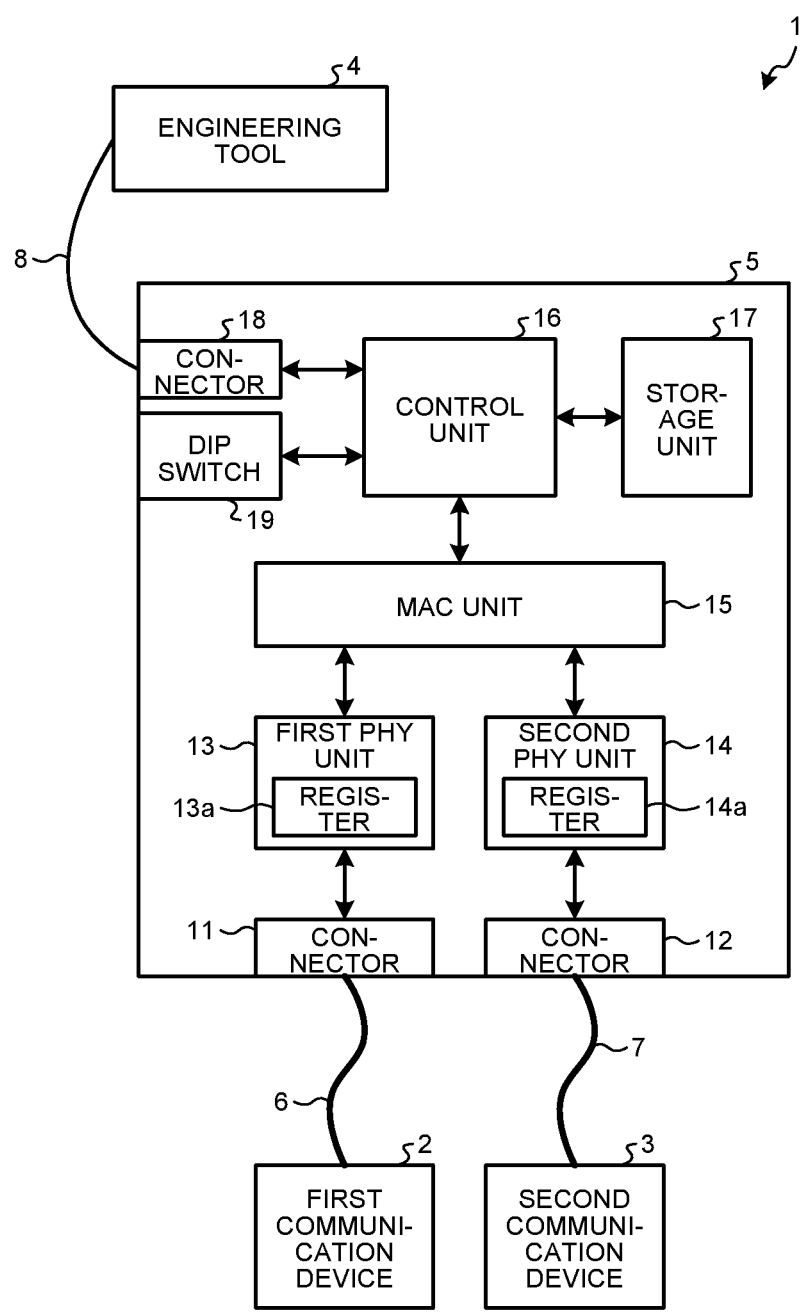
FIG. 1 is a diagram illustrating a configuration of a system including a communication apparatus according to a first embodiment.

FIG. 1 is a diagram illustrating a configuration of a system including a communication apparatus according to a first embodiment. A system 1 includes a first communication device 2, a second communication device 3, an engineering tool 4, and a communication apparatus 5.

The first communication device 2 and the second communication device 3 are exemplified by programmable controllers (JIS B 3502:2011 (PLC)).

The engineering tool 4 is a setting tool that sets the communication apparatus 5. The engineering tool 4 is configured by executing an engineering tool program on a personal computer.

The communication apparatus 5 includes connectors 11 and 12, a first PHY (physical layer) unit 13, a second PHY unit 14, a MAC (media access control) unit 15, a control unit 16, a storage unit 17, a connector 18, and a DIP switch 19.

The connector 11 is connected to one end of a communication cable 6. The other end of the communication cable 6 is connected to the first communication device 2. The connector 12 is connected to one end of a communication cable 7. The other end of the communication cable 7 is connected to the second communication device 3. The communication cables 6 and 7 are exemplified by twisted-pair cables.

The first PHY unit 13 and the second PHY unit 14 are physical layer circuits that function as physical layers that are first layers of the OSI reference model (Open Systems Interconnection reference model, ISO/IEC 7498).

The first PHY unit 13 is connected to the connector 11 and performs communication with a physical layer circuit of the first communication device 2. The second PHY unit 14 is connected to the connector 12 and performs communication with a physical layer circuit of the second communication device 3.

The first PHY unit 13 and the second PHY unit 14 each have an automatic negotiation function for determining communication setting information representing the physical settings of the communication with a physical layer circuit of a communication destination.

The first PHY unit 13 performs an automatic negotiation with the physical layer circuit of the first communication device 2 at a timing described later and determines the communication setting information between the first PHY unit 13 and the physical layer circuit of the first communication device 2.

The communication setting information is exemplified by a communication speed, distinction between a clock master and a clock slave, and distinction between an MDI (Medium Dependent Interface) and an MDI-X (Medium Dependent Interface Crossover).

The communication setting information determined between the first PHY unit 13 and the physical layer circuit of the first communication device 2 is written in a register 13a in the first PHY unit 13.

The second PHY unit 14 performs an automatic negotiation with a physical layer circuit of the second communication device 3 at a timing described later and determines the communication setting information between the second PHY unit 14 and the physical layer circuit of the second communication device 3.

The communication setting information determined between the second PHY unit 14 and the physical layer circuit of the second communication device 3 is written in a register 14a in the second PHY unit 14.

The MAC unit 15 is a data link layer circuit that functions as a data link layer that is a second layer of the OSI reference model. The MAC unit 15 is connected to the first PHY unit 13 and the second PHY unit 14 and performs communication between a data link layer circuit of the first communication device 2 and a data link layer circuit of the second communication device 3.

The connector 18 is connected to one end of a cable 8. The other end of the cable 8 is connected to the engineering tool 4. The cable 8 is exemplified by an RS-232-C cable and a USB (Universal Serial Bus).

The control unit 16 is connected to the MAC unit 15, the storage unit 17, the connector 18, and the DIP switch 19 and it executes a firmware program stored in the storage unit 17 so as to function as at least one of the layers of the OSI reference model: a network layer, which is a third layer; a transport layer, which is a fourth layer; a session layer, which is a fifth layer; a presentation layer, which is a sixth layer; and an application layer, which is a seventh layer. The control unit 16 also controls the first PHY unit 13, the second PHY unit 14, and the MAC unit 15. The control unit 16 is exemplified by a CPU (central processing unit).

The storage unit 17 stores the firmware program therein and is a nonvolatile storage circuit in which pieces of communication setting information stored in the registers 13a and 14a are written at a timing described later. The storage unit 17 is exemplified by a Flash Memory®.

The communication apparatus 5 can be an expansion board inserted into an expansion slot on a motherboard in the engineering tool 4. The expansion slot is exemplified by a PCI Express® expansion slot.

In the first embodiment, the communication apparatus 5 includes two physical layer circuits of the first PHY unit 13 and the second PHY unit 14. However, the communication apparatus 5 can include one or more physical layer circuits.

An operation of the communication apparatus 5 is described next.

The communication apparatus 5 has three operating modes: a first operating mode, a second operating mode, and a third operating mode. The operating mode of the communication apparatus 5 is set by the DIP switch 19. The operating mode of the communication apparatus 5 can be set by a command signal from the engineering tool 4.

In the first operating mode, the communication apparatus 5 uses the automatic negotiation function of the first PHY unit 13 and the second PHY unit 14 to establish communication, i.e., to achieve a link-up between the first communication device 2 and the second communication device 3. Specifically, in the first operating mode, the control unit 16 validates the automatic negotiation function of the first PHY unit 13 and the second PHY unit 14. In the first embodiment, the first operating mode is referred to as the "normal operating mode".

In the first operating mode, when the communication apparatus 5 is turned on or the communication apparatus 5 is connected to the first communication device 2 by the cable 6, the first PHY unit 13 performs an automatic negotiation with the first communication device 2 and establishes communication, i.e., it achieves a link-up with the first communication device 2. Consequently, the engineering tool 4 can perform communication with the first communication device 2. The first PHY unit 13 stores the determined communication setting information in the register 13a.

In the first operating mode, when the communication apparatus 5 is turned on or the communication apparatus 5 is connected to the second communication device 3 by the cable 7, the second PHY unit 14 performs an automatic negotiation with the second communication device 3 and establishes communication, i.e., it achieves a link-up with the second communication device 3. Consequently, the engineering tool 4 can perform communication with the second communication device 3. The second PHY unit 14 stores the determined communication setting information in the register 14a.

In the second operating mode, the communication apparatus 5 uses the automatic negotiation function of the first PHY unit 13 and the second PHY unit 14 to establish communication, i.e., to achieve a link-up between the first communication device 2 and the second communication device 3. Specifically, in the second operating mode, the control unit 16 validates the automatic negotiation function of the first PHY unit 13 and the second PHY unit 14. Consequently, the engineering tool 4 can perform communication with the first communication device 2 and the second communication device 3.

In the second operating mode, when the operating mode transitions from another operating mode to the second operating mode or when communication with the first communication device 2 or the second communication device 3 is established, i.e., a link-up is achieved by using the automatic negotiation function of the first PHY unit 13 or the second PHY unit 14, then the communication apparatus 5 reads the communication setting information when linked up with the first communication device 2 stored in the register 13a or the communication setting information when linked up with the second communication device 3 stored in the register 14a and the communication apparatus 5 stores the communication setting information in the storage unit 17. In the first embodiment, the second operating mode is referred to as a "high-speed link-up setting mode".

Figure 2:
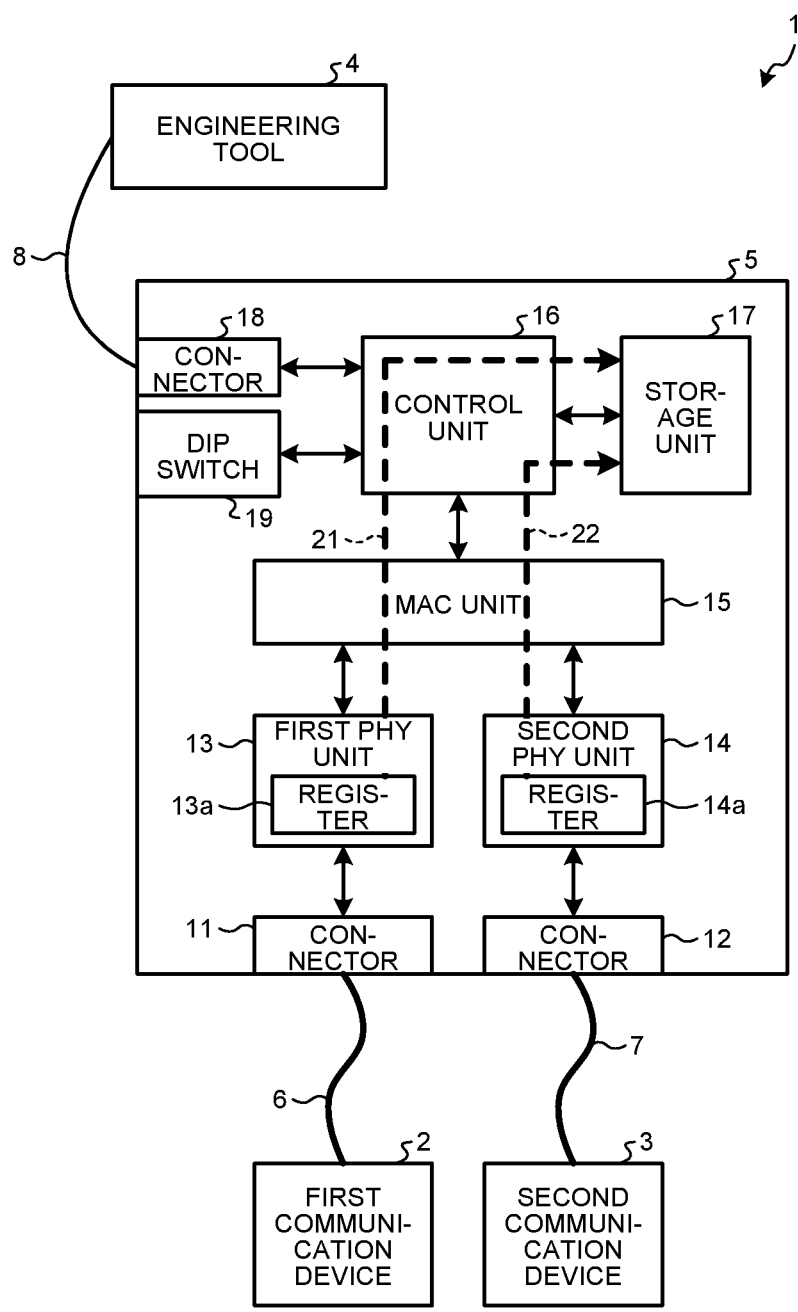
FIG. 2 is a diagram illustrating the configuration of the system including the communication apparatus according to the first embodiment.

FIG. 2 is a diagram illustrating the configuration of the system including the communication apparatus according to the first embodiment. As illustrated in FIG. 2, in the high-speed link-up setting mode, the control unit 16 reads the communication setting information stored in the register 13a when there is a link-up with the first communication device 2 and writes the communication setting information in the storage unit 17 along a route 21 via the register 13a, the first PHY unit 13, the MAC unit 15, the control unit 16, and the storage unit 17. The control unit 16 also reads the communication setting information stored in the register 14a when there is a link-up with the second communication device 3 and writes the communication setting information in the storage unit 17 along a route 22 via the register 14a, the second PHY unit 14, the MAC unit 15, the control unit 16, and the storage unit 17.

In the high-speed link-up setting mode, when the operating mode transitions from another operating mode to the high-speed link-up setting mode or every time a communication state with the first communication device 2 or the second communication device 3 is changed from link-down to link-up, then the control unit 16 overwrites, in the storage unit 17, the communication setting information stored in the register 13a when there is a link-up with the second communication device 2 or the communication setting information stored in the register 14a when there is a link-up with the second communication device 3. Consequently, in the high-speed link-up setting mode, the pieces of communication setting information in the registers 13a and 14a and the pieces of communication setting information in the storage unit 17 are always identical to each other.

In the third operating mode, the communication apparatus 5 invalidates the automatic negotiation function of the first PHY unit 13 and the second PHY unit 14. Specifically, in the third operating mode, the control unit 16 invalidates the automatic negotiation function of the first PHY unit 13 and the second PHY unit 14.

In the third operating mode, when turning on the power to the communication apparatus 5, the communication apparatus 5 reads the communication setting information when there is a link-up with the first communication device 2 and the communication setting information when there is a link-up with the second communication device 3, which have been written in the storage unit 17 in the high-speed link-up setting mode, and then it writes the read two pieces of communication setting information in the register 13a and the register 14a, respectively, thereby respectively establishing communication between the first PHY unit 13 and the first communication device 2 and communication between the second PHY unit 14 and the second communication device 3. In the first embodiment, the third operating mode is referred to as a "high-speed link-up operating mode".

Figure 3:
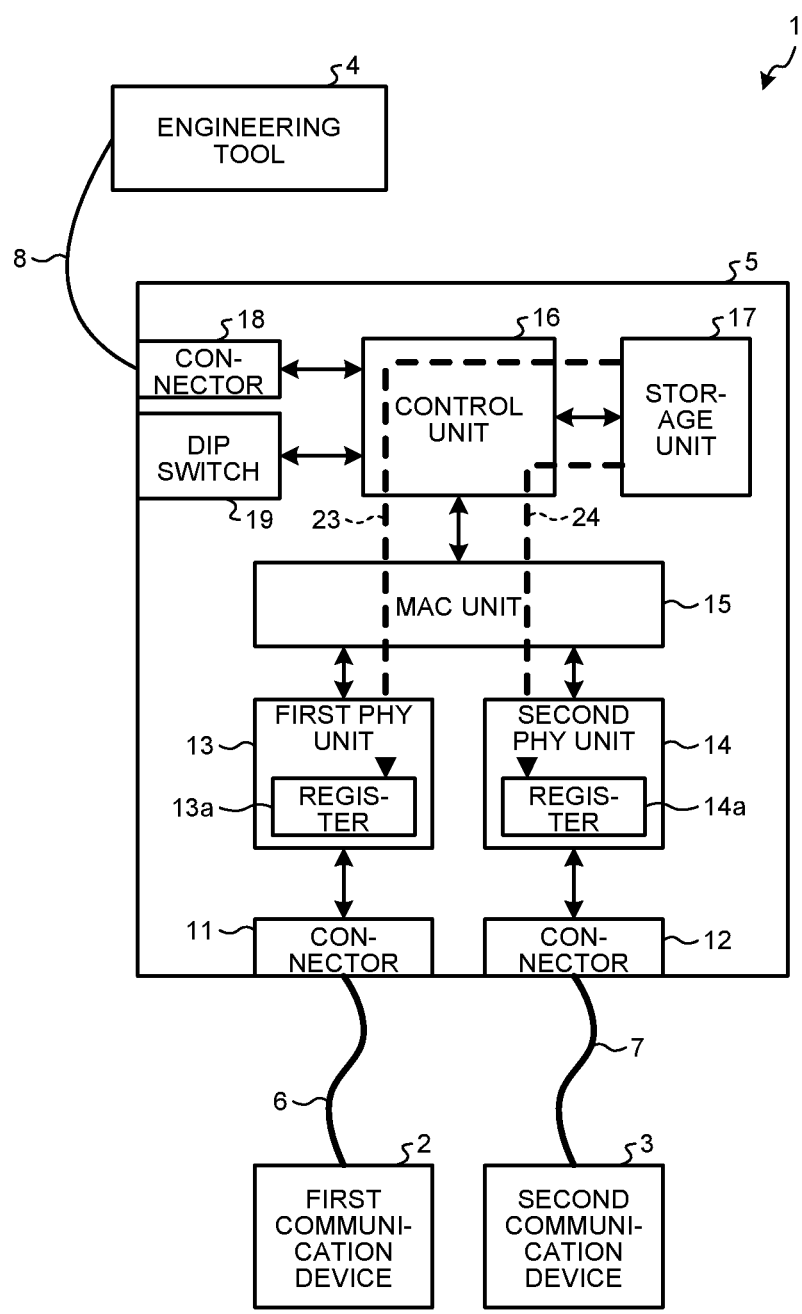
FIG. 3 is a diagram illustrating the configuration of the system including the communication apparatus according to the first embodiment.

FIG. 3 is a diagram illustrating the configuration of the system including the communication apparatus according to the first embodiment. As illustrated in FIG. 3, in the high-speed link-up operating mode, the control unit 16 reads the communication setting information stored in the storage unit 17 when there is a link up with the first communication device 2 and stores the communication setting information in the register 13a along a route 23 via the storage unit 17, the control unit 16, the MAC unit 15, the first PHY unit 13, and the register 13a. Consequently, the first PHY unit 13 can achieve a link-up with the first communication device 2.

The control unit 16 also reads the communication setting information stored in the storage unit 17 when there is a link-up with the second communication device 3 and stores the communication setting information in the register 14a, along a route 24 via the storage unit 17, the control unit 16, the MAC unit 15, the second PHY unit 14, and the register 14a. Consequently, the second PHY unit 14 can achieve a link-up with the second communication device 3.

Consequently, in the high-speed link-up operating mode, the communication apparatus 5 can achieve a link-up with the first communication device 2 and the second communication device 3 without performing an automatic negotiation. Consequently, the communication apparatus 5 does not require a period of time for an automatic negotiation, and thus it can reduce the time for a link-up with the first communication device 2 and the second communication device 3. It is particularly effective when a link-down occurs frequently between the communication apparatus 5 and the first communication device 2 and the second communication device 3.

Because the communication apparatus 5 does not perform an automatic negotiation in the high-speed link-up operating mode, the inconveniences described below can occur. That is, if a network configuration of the system 1 is changed, the communication apparatus 5 is not able to achieve a link-up with the first communication device 2 and the second communication device 3.

Figure 4:
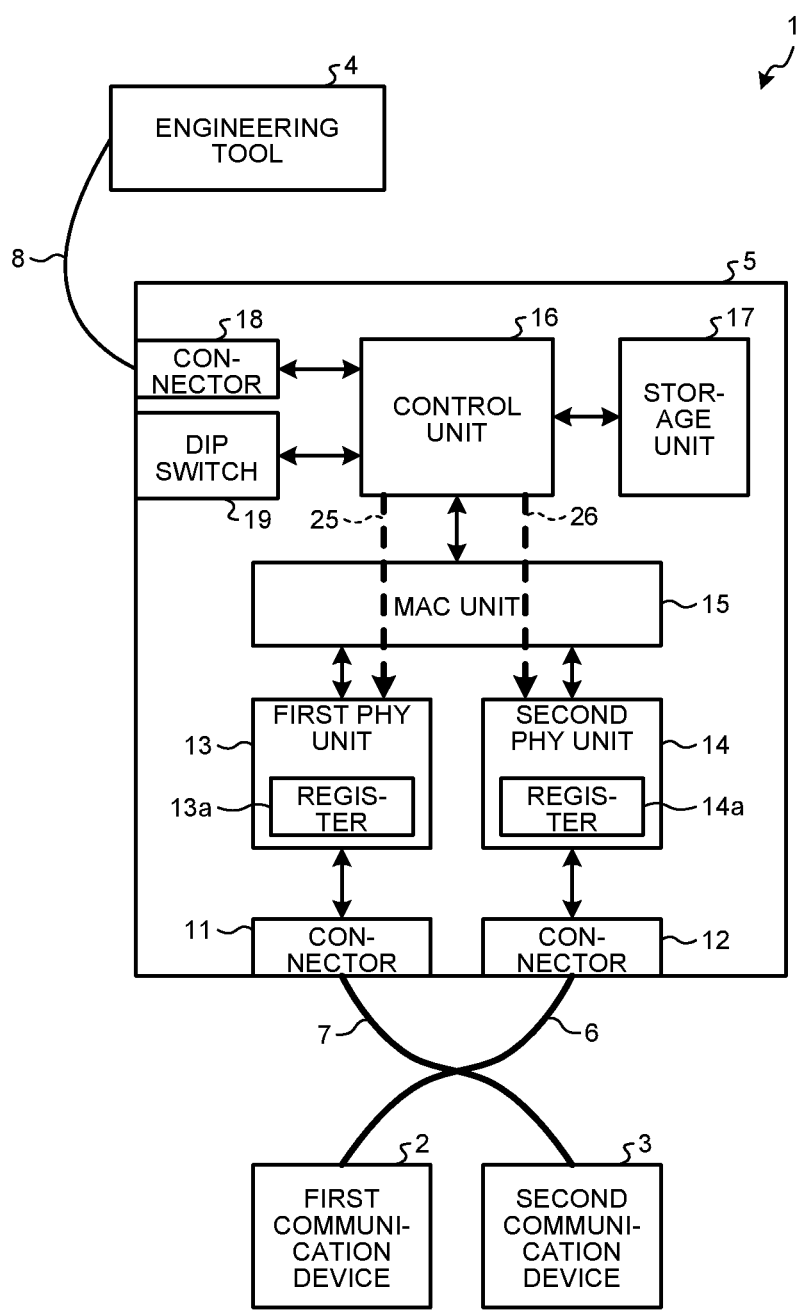
FIG. 4 is a diagram illustrating a configuration of the system including the communication apparatus according to the first embodiment.

FIG. 4 is a diagram illustrating a configuration of the system including the communication apparatus according to the first embodiment. As illustrated in FIG. 4, the cable 6 is disconnected from the connector 11 and connected to the connector 12, and the cable 7 is disconnected from the connector 12 and connected to the connector 11.

In the network configuration illustrated in FIG. 4, when the communication apparatus 5 set to the high-speed link-up operating mode is turned on, the communication setting information for the first communication device 2 stored in the storage unit 17 is written in the register 13a, and the communication setting information for the second communication device 3 stored in the storage unit 17 is written in the register 14a.

The first PHY unit 13 then attempts to communicate with the second communication device 3 by using the communication setting information for the first communication device 2, and thus the communication apparatus 5 may not be able to achieve a link-up with the second communication device 3. Similarly, because the second PHY unit 14 attempts to communicate with the first communication device 2 by using the communication setting information for the second communication device 3, the communication apparatus 5 may not be able to achieve a link-up with the first communication device 2.

If the communication setting information determined between the first PHY unit 13 and the first communication device 2 and the communication setting information determined between the second PHY unit 14 and the second communication device 3 are identical to each other, even in the network configuration illustrated in FIG. 4, the link-up between the first PHY unit 13 and the second communication device 3 and the link-up between the second PHY unit 14 and the first communication device 2 can be achieved. However, if the communication setting information determined between the first PHY unit 13 and the first communication device 2 and the communication setting information determined between the second PHY unit 14 and the second communication device 3 are not identical to each other, the link-up between the first PHY unit 13 and the second communication device 3 and the link-up between the second PHY unit 14 and the first communication device 2 cannot be achieved.

Thus, in the high-speed link-up operating mode, if respective link-ups between the first PHY unit 13 and the second PHY unit 14 and between the first communication device 2 and the second communication device 3 are not achieved even if a predetermined time period has passed, the communication apparatus 5 transitions to the normal operating mode regardless of the command from the DIP switch 19 or the engineering tool 4.

It can be determined whether a predetermined time period has passed by respectively providing a flag representing link-up or link-down in the first PHY unit 13 in the register 13a and a flag representing link-up or link-down in the second PHY unit 14 in the register 14a to monitor these flags regularly by using the control unit 16.

Specifically, when the mode transitions from the high-speed link-up operating mode to the normal operating mode, the control unit 16 transmits a command to validate an automatic negotiation to the first PHY unit 13 along a route 25 via the control unit 16, the MAC unit 15, and the first PHY unit 13. The first PHY unit 13 performs an automatic negotiation with the second communication device 3 based on the command from the control unit 16 to determine the communication setting information for the second communication device 3 and it writes the determined communication setting information in the register 13a. Consequently, the first PHY unit 13 can achieve a link-up with the second communication device 3. Consequently, the engineering tool 4 can perform communication with the second communication device 3.

Similarly, the control unit 16 transmits a command to validate an automatic negotiation to the second PHY unit 14 along a route 26 via the control unit 16, the MAC unit 15, and the second PHY unit 14. The second PHY unit 14 performs an automatic negotiation with the first communication device 2 based on the command from the control unit 16 to determine the communication setting information for the first communication device 2 and it writes the determined communication setting information in the register 14a. Consequently, the second PHY unit 14 can achieve a link-up with the first communication device 2. Consequently, the engineering tool 4 can perform communication with the first communication device 2.

Consequently, even if the network configuration is changed, the communication apparatus 5 can realize the link-up between the first PHY unit 13 and the second communication device 3 and the link-up between the second PHY unit 14 and the first communication device 2.

FIG. 5 is a table illustrating processing items when establishing communication of the communication apparatus in respective operating modes according to the first embodiment. A first row in a table 30 indicates processing items when establishing communication in the normal operating mode, a second row in the table 30 indicates processing items when establishing communication in the high-speed link-up setting mode, and a third row in the table 30 indicates processing items when establishing communication in the high-speed link-up operating mode.

As shown in the first row in the table 30, in the normal operating mode, the communication apparatus 5 validates the automatic negotiation function of the first PHY unit 13 and the second PHY unit 14. In the normal operating mode, the communication apparatus 5 determines the pieces of communication setting information by the automatic negotiation function of the first PHY unit 13 and the second PHY unit 14. Further, in the normal operating mode, the communication apparatus 5 does not access the storage unit 17.

As shown in the second row in the table 30, in the high-speed link-up setting mode, the communication apparatus 5 validates the automatic negotiation function of the first PHY unit 13 and the second PHY unit 14. In the high-speed link-up setting mode, the communication apparatus 5 determines the pieces of communication setting information by the automatic negotiation function of the first PHY unit 13 and the second PHY unit 14. Further, in the high-speed link-up setting mode, the communication apparatus 5 writes the communication setting information for the first communication device 2 stored in the register 13a or the communication setting information for the second communication device 3 stored in the register 14a in the storage unit 17 at any timing described below.

That is, the control unit 16 writes the communication setting information for the first communication device 2 stored in the register 13a and the communication setting information for the second communication device 3 stored in the register 14a in the storage unit 17, at the transition from another operating mode to the high-speed link-up setting mode.

When establishing communication, that is, achieving link-up with the first communication device 2 by using the automatic negotiation function of the first PHY unit 13, that is, when a communication state with the first communication device 2 changes from link-down to link-up, the control unit 16 writes the communication setting information when linked-up with the first communication device 2 stored in the register 13a in the storage unit 17.

Furthermore, when establishing communication, that is, achieving link-up with the second communication device 3 by using the automatic negotiation function of the second PHY unit 14, that is, when a communication state with the second communication device 3 changes from link-down to link-up, the control unit 16 writes the communication setting information when linked-up with the second communication device 3, which is stored in the register 14*a*, in the storage unit 17.

As shown in the third row in the table 30, in the high-speed link-up operating mode, the communication apparatus 5 invalidates the automatic negotiation function of the first PHY unit 13 and the second PHY unit 14. Further, in the high-speed link-up operating mode, the communication apparatus 5 reads and uses the pieces of communication setting information stored in the storage unit 17. In the high-speed link-up operating mode, when turning on the power, the communication apparatus 5 reads the communication setting information when linked-up with the first communication device 2 and the communication setting information when linked-up with the second communication device 3, which have been stored in the storage unit 17, and it writes the two pieces of read communication setting information respectively in the registers 13*a* and 14*a*.

Figure 6:
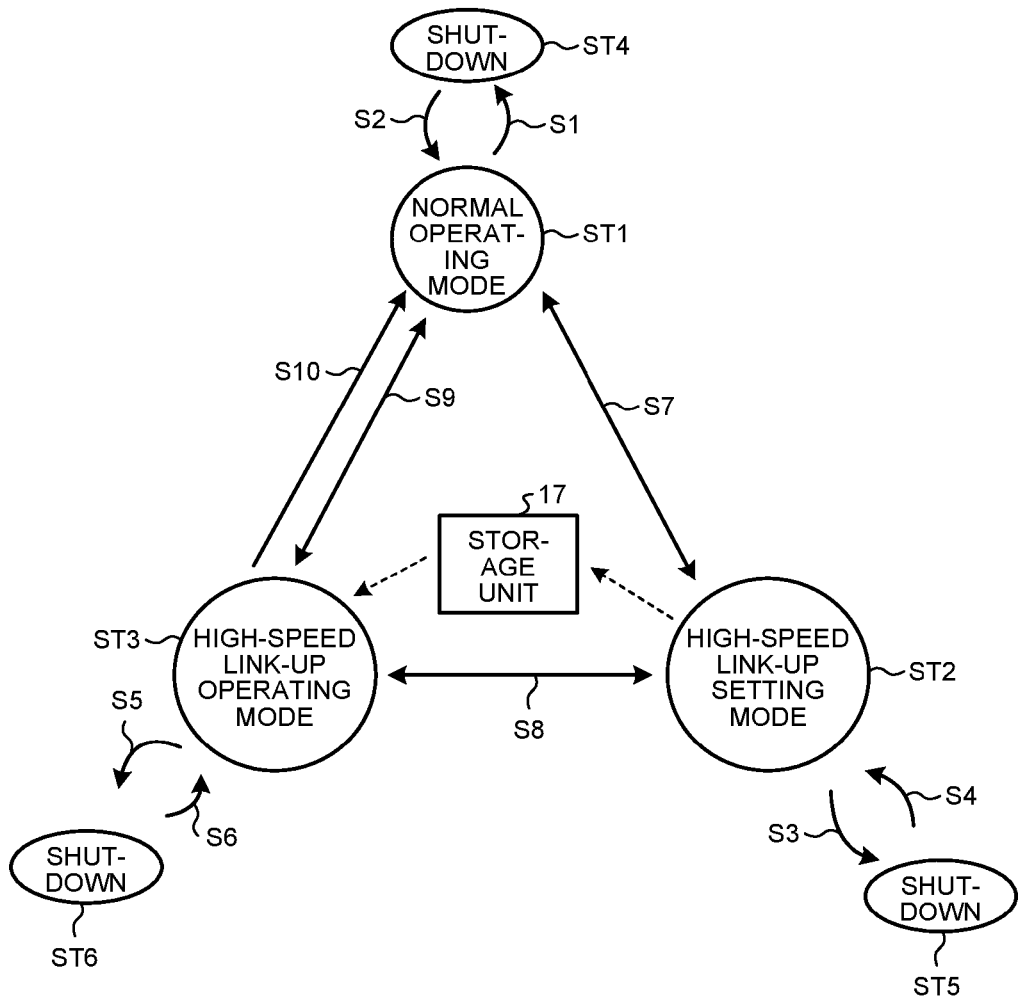
FIG. 6 is a state transition diagram of the communication apparatus according to the first embodiment.

FIG. 6 is a state transition diagram of the communication apparatus according to the first embodiment. In a normal operating mode ST1, when power is turned off, the control unit 16 transitions to a shutdown state ST4 via a transition route S1. In the shutdown state ST4, when power is turned on, the control unit 16 transitions to the normal operating mode via a transition route S2, and it causes the first PHY unit 13 and the second PHY unit 14 to perform an automatic negotiation. Consequently, the first PHY unit 13 and the second PHY unit 14 can achieve the link-up with respective communication destinations. Consequently, the engineering tool 4 can perform communication with the first communication device 2 and the second communication device 3.

In a high-speed link-up setting mode ST2, when power is turned off, the control unit 16 transitions to a shutdown state ST5 via a transition route S3. In the shutdown state ST5, when power is turned on, the control unit 16 transitions to the high-speed link-up setting mode ST2 via a transition route S4, and it causes the first PHY unit 13 and the second PHY unit 14 to perform an automatic negotiation. Further, the control unit 16 reads the pieces of communication setting information in the registers 13*a* and 14*a* respectively, and it writes the pieces of communication setting information in the storage unit 17. Consequently, the first PHY unit 13 and the second PHY unit 14 can achieve the link-up with the respective communication destinations. Consequently, the engineering tool 4 can perform communication with the first communication device 2 and the second communication device 3.

In a high-speed link-up operating mode ST3, when power is turned off, the control unit 16 transitions to a shutdown state ST6 via a transition route S5. In the shutdown state ST6, when power is turned on, the control unit 16 transitions to the high-speed link-up operating mode ST3 via a transition route S6. At this time, the control unit 16 invalidates the automatic negotiation function of the first PHY unit 13 and the second PHY unit 14, reads the two pieces of communication setting information stored in the storage unit 17, and writes the pieces of communication setting information in the registers 13*a* and 14*a*, respectively. Consequently, the first PHY unit 13 and the second PHY unit 14 can achieve the link-up with the respective communication destinations without performing an automatic negotiation. Accordingly, the time required for an automatic negotiation is not required, and the communication apparatus 5 can reduce the time for link-up with the first communication device 2 and the second communication device 3. Consequently, the engineering tool 4 can perform communication with the first communication device 2 and the second communication device 3.

When being set by the DIP switch 19 or being indicated from the engineering tool 4, the control unit 16 transitions from the normal operating mode ST1 to the high-speed link-up setting mode ST2, or it transitions from the high-speed link-up setting mode ST2 to the normal operating mode ST1 via a transition route S7.

When being set by the DIP switch 19 or being indicated from the engineering tool 4, the control unit 16 transitions from the high-speed link-up setting mode ST2 to the high-speed link-up operating mode ST3, or it transitions from the high-speed link-up operating mode ST3 to the high-speed link-up setting mode ST2 via a transition route S8.

When being set by the DIP switch 19 or being indicated from the engineering tool 4, the control unit 16 transitions from the normal operating mode ST1 to the high-speed link-up operating mode ST3, or it transitions from the high-speed link-up operating mode ST3 to the normal operating mode ST1 via a transition route S9.

In the high-speed link-up operating mode ST3, if the first PHY unit 13 or the second PHY unit 14 cannot achieve the link-up even if a predetermined time period has passed, the control unit 16 transitions to the normal operating mode ST1 via a transition route S10, and it causes the first PHY unit 13 and the second PHY unit 14 to perform an automatic negotiation. Accordingly, even if a network configuration is changed, the first PHY unit 13 and the second PHY unit 14 can achieve the link-up respectively with the communication destinations. Accordingly, even if the network configuration is changed, the communication apparatus 5 can achieve a link-up with the first communication device 2 and the second communication device 3. Consequently, the engineering tool 4 can perform communication with the first communication device 2 and the second communication device 3.

Figure 7:
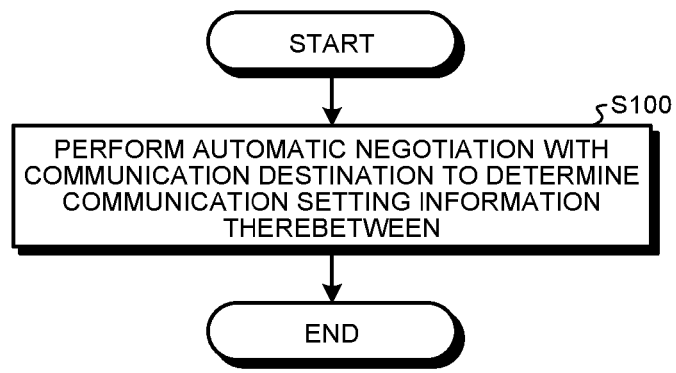
FIG. 7 is a flowchart illustrating an operation of the communication apparatus according to the first embodiment.

FIG. 7 is a flowchart illustrating an operation of the communication apparatus according to the first embodiment. FIG. 7 is a flowchart illustrating an operation of the communication apparatus 5 in the normal operating mode.

In the normal operating mode, at Step S100, the communication apparatus 5 performs an automatic negotiation with the first communication device 2 and the second communication device 3, which are the communication destinations, to determine the communication setting information therebetween, respectively. Consequently, the communication apparatus 5 can achieve link-up respectively with the communication destinations. Consequently, the engineering tool 4 can perform communication with the first communication device 2 and the second communication device 3.

Figure 8:
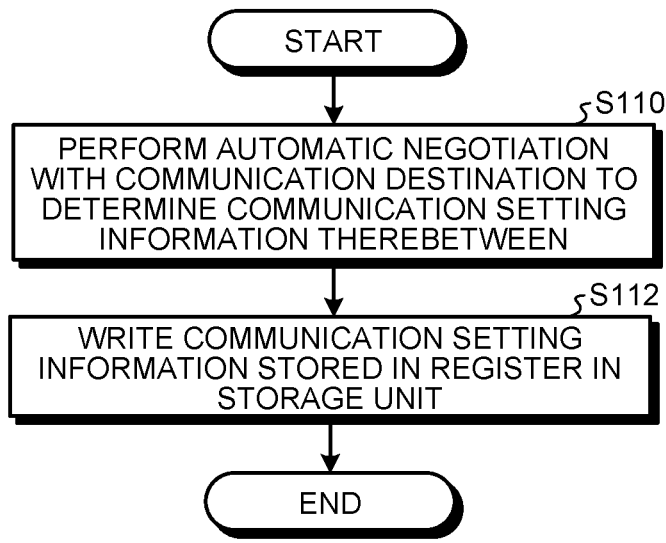
FIG. 8 is a flowchart illustrating an operation of the communication apparatus according to the first embodiment.

FIG. 8 is a flowchart illustrating an operation of the communication apparatus according to the first embodiment. FIG. 8 is a flowchart illustrating an operation of the communication apparatus 5 in the high-speed link-up setting mode.

In the high-speed link-up setting mode, at Step S110, the communication apparatus 5 performs an automatic negotiation with the first communication device 2 and the second communication device 3, which are the communication destinations, to determine the communication setting information therebetween respectively. Consequently, the communication apparatus 5 can achieve the link-up respectively with the communication destinations. Consequently, the engineering tool 4 can perform communication with the first communication device 2 and the second communication device 3.

At Step S112, the communication apparatus 5 writes the pieces of communication setting information stored in the registers 13a and 14a in the storage unit 17. Consequently, the communication apparatus 5 can store the communication setting information when linked-up in the storage unit 17.

Figure 9:
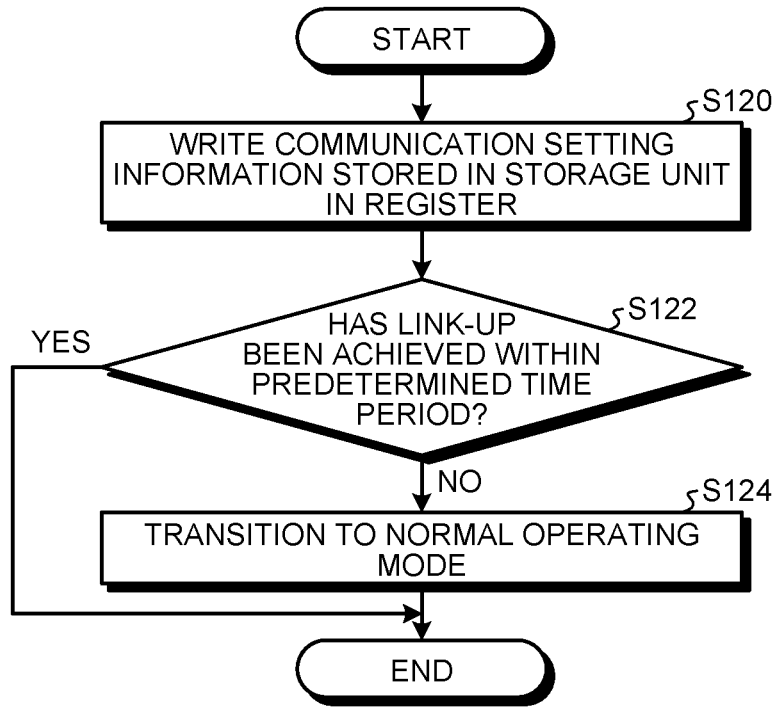
FIG. 9 is a flowchart illustrating an operation of the communication apparatus according to the first embodiment.

FIG. 9 is a flowchart illustrating an operation of the communication apparatus according to the first embodiment. FIG. 9 is a flowchart illustrating an operation of the communication apparatus 5 in the high-speed link-up operating mode.

In the high-speed link-up operating mode, at Step S120, the communication apparatus 5 writes the pieces of communication setting information stored in the storage unit in the registers 13a and 14a.

At Step S122, the communication apparatus 5 then determines whether link-up has been achieved with the first communication device 2 and the second communication device 3 within a predetermined time period. At Step S122, if determining that link-up has been achieved with the first communication device 2 and the second communication device 3 within the predetermined time period (YES at Step S122), the communication apparatus 5 ends the process. Consequently, the communication apparatus 5 can achieve a link-up with the first communication device 2 and the second communication device 3 without performing an automatic negotiation. Accordingly, a time required for an automatic negotiation is not required, and the communication apparatus 5 can reduce the time for link-up with the first communication device 2 and the second communication device 3. Consequently, the engineering tool 4 can perform communication with the first communication device 2 and the second communication device 3.

On the other hand, at Step S122, if determining that link-up has not been achieved with the first communication device 2 and the second communication device 3 within the predetermined time period (NO at Step S122), the communication apparatus 5 transitions to the normal operating mode illustrated in FIG. 7 at Step S124. In the normal operating mode, the communication apparatus 5 performs an automatic negotiation with the first communication device 2 and the second communication device 3. Accordingly, even if a network configuration is changed, the communication apparatus 5 can achieve a link-up with the first communication device 2 and the second communication device 3. Consequently, the engineering tool 4 can perform communication with the first communication device 2 and the second communication device 3.

The configuration described in the above embodiment is only an example of the contents of the present invention. The configuration can be combined with other publicly known techniques, and a part of the configuration can be modified or omitted without departing from the scope of the present invention.

REFERENCE SIGNS LIST

1 system, 2 first communication device, 3 second communication device, 4 engineering tool, 5 communication apparatus, 13 first PHY unit, 13a register, second PHY unit, 14a register, 15 MAC unit, 16 control unit, 17 storage unit.

The invention claimed is:

1. A communication apparatus comprising:
a physical layer circuit that functions as a physical layer for communication with a communication destination for determining communication setting information representing a physical setting of communication with the communication destination;
a nonvolatile storage unit; and
a controller that controls the physical layer circuit,
wherein, in a first operating mode, the controller controls the physical layer circuit such that the communication setting information determined with the communication destination is written in the storage unit,
wherein, in a second operating mode, the controller writes the communication setting information written in the first operating mode in the storage unit in the physical layer circuit, and
wherein the controller overwrites, in the nonvolatile storage unit, the communication setting information stored in the physical layer circuit, when an operating mode of the communication apparatus transitions to the first operating mode or every time a communication state is changed from link-down to link-up.

2. The communication apparatus according to claim 1, further comprising a switch for setting an operating mode of the communication apparatus to one of the first operating mode and the second operating mode.

3. The communication apparatus according to claim 1, wherein a command signal that indicates an operating mode of the communication apparatus from among the first operating mode and the second operating mode, is input to the controller from an external device.

4. The communication apparatus according to claim 1, wherein, in a third operating mode which is a normal operating mode of the communication apparatus, the controller performs the automatic negotiation with the communication destination and establishes communication with the communication destination.

5. The communication apparatus according to claim 4, wherein during the normal operating mode, the controller does not access the storage unit.

6. A communication apparatus comprising:
a physical layer circuit that functions as a physical layer for communication with a communication destination for determining communication setting information representing a physical setting of communication with the communication destination;
a nonvolatile storage unit; and
a controller that controls the physical layer circuit,
wherein, in a first operating mode, the controller controls the physical layer circuit such that the communication setting information with the communication destination is written in the storage unit,
wherein, in a second operating mode, the controller writes the communication setting information stored in the storage unit in the physical layer circuit,
wherein the controller, if communication between the physical layer circuit and the communication destination is not established even if a predetermined time period has passed since the controller has written the communication setting information stored in the storage unit in the physical layer circuit, controls the physical layer circuit such that the communication setting information with the communication destination is determined, and
wherein the controller overwrites, in the nonvolatile storage unit, the communication setting information stored in the physical layer circuit, when an operating mode of the communication apparatus transitions to the first operating mode or every time a communication state is changed from link-down to link-up.

7. A communication method comprising:
in a first operating mode, controlling a physical layer circuit that functions as a physical layer for communication with a communication destination such that communication setting information representing a physical setting of communication with the communication destination is determined, and writing the determined communication setting information in a nonvolatile storage unit;
in a second operating mode, writing the communication setting information written in the storage unit at the first operating mode in the physical layer circuit; and
overwriting, in the nonvolatile storage unit, the communication setting information stored in the physical layer circuit, when an operating mode transitions to the first operating mode or every time a communication state is changed from link-down to link-up.

8. The communication method according to claim 7, further comprising setting, by a switch, a communication mode said first operating mode and said second operating mode.

9. The communication method according to claim 7, wherein further comprising receiving, from an external device, a command signal indicating a communication mode selected from among said first operating mode and said second operating mode.

10. A communication method comprising:
in a first operating mode, controlling a physical layer circuit that functions as a physical layer for communication with a communication destination such that communication setting information representing a physical setting of communication with the communication destination is written in a nonvolatile storage unit;
in a second operating mode, writing the communication setting information written in the storage unit in the physical layer circuit;
if communication between the physical layer circuit and the communication destination is not established even if a predetermined time period has passed since the communication setting information stored in the storage unit has been written in the physical layer circuit, controlling the physical layer circuit such that the communication setting information with the communication destination is determined; and
overwriting, in the nonvolatile storage unit, the communication setting information stored in the physical layer circuit, when an operating mode transitions to the first operating mode or every time a communication state is changed from link-down to link-up.

* * * * *